US012742715B2

(12) United States Patent
van Duijn et al.

(10) Patent No.: US 12,742,715 B2
(45) Date of Patent: Sep. 22, 2026

(54) IMPROVING ACCURACY BY ADDING ADDITIONAL SENSORS TO A DENSITY MEASURING SYSTEM

(71) Applicant: Honeywell International Inc., Charlotte, NC (US)

(72) Inventors: Dirk van Duijn, Katwijk (NL); Ronald Schrier, Delft (NL); Frank Edo Bakker, Edam (NL)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 403 days.

(21) Appl. No.: 18/222,435

(22) Filed: Jul. 15, 2023

(65) Prior Publication Data

US 2025/0020562 A1 Jan. 16, 2025

(51) Int. Cl.
*G01N 9/26* (2006.01)

(52) U.S. Cl.
CPC .................................... *G01N 9/26* (2013.01)

(58) Field of Classification Search
None
See application file for complete search history.

(56) References Cited

U.S. PATENT DOCUMENTS 8,096,177 B2 1/2012 Burris
8,997,549 B2 4/2015 Joosten et al.
10,274,355 B2 4/2019 Van Bekkum
10,564,023 B2 2/2020 Schrier et al.
2014/0016126 A1 1/2014 Versluijs et al.
2023/0057613 A1 2/2023 Endean

FOREIGN PATENT DOCUMENTS

CN 106767936 A * 5/2017
CN 113720729 A 11/2021
EP 3359926 B1 12/2020
JP 6486758 B2 3/2019
WO 2019083228 A1 5/2019

OTHER PUBLICATIONS

"Installation Manual 954 SmartServo FlexLine", Part No. 4417341 Revision 10, Honeywell International Inc., 2019.
"SmartLine Level for Displacer or Float Replacements Installed in Side Cages and Still Wells", Honeywell International 2019.

* cited by examiner

*Primary Examiner* — Daniel S Larkin
(74) *Attorney, Agent, or Firm* — Ingrassia Fisher & Lorenz

(57) ABSTRACT

Methods, systems, and devices for measuring density involve performing a buoyancy measurement with respect to a product in a tank and determining a first density based on the buoyancy measurement. A pressure measurement of pressure in the tank is performed, and a second density is determined based on the pressure measurement. An offset of the buoyancy measurement is calculated using the first and second densities, and the offset is applied to correct the first density measured at the predetermined position in the tank.

17 Claims, 4 Drawing Sheets

IMPROVING ACCURACY BY ADDING ADDITIONAL SENSORS TO A DENSITY MEASURING SYSTEM

TECHNICAL FIELD

Embodiments are generally related to density measurement devices, systems and methods. Embodiments also relate to methods and systems for measuring density in a storage tank. Embodiments further relate to methods and systems for improving density measurements in storage tanks.

BACKGROUND

Density measurements in storage tanks can be carried out using the buoyancy principle. The buoyancy principle states that an object submerged in a fluid experiences an upward force equal to the weight of the fluid it displaces. By measuring this buoyant force, the density of the fluid can be determined.

Density measurements based on the buoyancy principle are typically performed in storage tanks. The basic principle behind this method involves measuring the weight of the displaced fluid and relating it to the density of the fluid. A displacement method can be used as part of density measurements involving a measuring device, such as a displacer or a float, which can be immersed in the fluid within the tank. This device displaces a certain volume of the fluid based on its weight and buoyancy.

Prior to taking measurements, the equipment needs to be calibrated. Calibration involves determining the relationship between the buoyant force experienced by the measuring device and the density of the fluid at various known densities. A reference density can be established to compare the measured density. This can be a known density value or a calibration standard.

The measuring device is immersed in the fluid, and the buoyant force it experiences is recorded. The buoyant force is typically measured using load cells or pressure sensors. The measured buoyant force is related to the density of the fluid using the calibration data. The relationship between the buoyant force and density can be established through linear regression or other mathematical models. The calculated density value can be then displayed or recorded for further analysis or control purposes.

It is important to note that accurate density measurements may also require compensations for factors, such as temperature, pressure, and any impurities or contaminants in the fluid. These compensations can ensure that the density readings are corrected for variations in these parameters and provide an accurate representation of the fluid's density.

Overall, density measurements in storage tanks based on the buoyancy principle can provide a reliable method to determine the density of fluids, allowing for quality control, inventory management, and process optimization in various industries. The application of the buoyancy principle for density measurements in storage tanks is a widely used technique in various industries, including oil and gas, chemical, and food processing.

Current density measurement techniques involve directly measuring the product density of a product in a liquid storage tank by measuring buoyancy on a body/displacement element that can be submerged in the liquid. This is a very direct method that does not require any sampling off the product and the use of measuring devices external to the storage tank.

However various error sources can influence the measurement, such as the initial error in the known volume of the body that is being lowered into the product. Furthermore, increasingly accurate density measurement requirements for liquid storage tanks is needed as requirements change by region and country. For example, legislation in various countries has made it a necessity to perform a density measurement before and/or after a transfer of product. Some current solutions have an accuracy of 3 to 5 Kg/m3 while new standards require 0.5 Kg/m3.

The present inventors believe that a need exists for a new technique, device and/or system for improving the measurement accuracy for density measurements in storage tanks based on the buoyancy principle.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved method, system and device for measuring density in a storage tank.

It is another aspect of the embodiments to provide for a density measurement method, system and device based on the buoyancy principle and the use of one or more separate sensors that measure a related parameter (e.g., pressure) in order to improve the accuracy of density measurements in storage tanks.

The aforementioned aspects and other objectives can now be achieved as described herein.

In an embodiment, a method for measuring density, can involve: performing a buoyancy measurement with respect to a product in a tank and determining a first density based on the buoyancy measurement; performing a pressure measurement of pressure in the tank and determining a second density based on the pressure measurement; and calculating an average density in the tank based on the first and second densities and combining the average densities measured in at least two positions in the tank to increase an accuracy in measuring density within the tank.

An embodiment can also involve using the average density determined at a highest level of the product in the tank to calculate an offset of the buoyancy measurement.

An embodiment may further involve using the average density based on the pressure measurement when the product level is at a high level of the product to compensate for offset errors.

An embodiment can further involve using the average density determined at a highest level of the product in the tank to calculate an offset of the buoyancy measurement, and using the average density based on the pressure measurement when the product level is at a high level of the product to compensate for offset errors with respect to the offset.

In an embodiment, the buoyancy measurement can be performed by an electromechanical servo gauge.

In an embodiment, the pressure measurement can be performed by a pressure sensor comprising a pressure transmitter.

In an embodiment, the pressure may comprise hydrostatic pressure.

In an embodiment, a system for measuring density, can include: at least one processor; and a non-transitory computer-usable medium embodying computer program code, the computer-usable medium operable to communicate with the at least one processor. The computer program code can include instructions executable by the at least one processor and operable for: performing a buoyancy measurement with respect to a product in a tank and determining a first density based on the buoyancy measurement, performing a pressure measurement of pressure in the tank and determining a second density based on the pressure measurement, and calculating an average density in the tank based on the first and second densities and combining the average densities measured in at least two positions in the tank to increase an accuracy in measuring density within the tank.

In an embodiment, the instructions are further operable to use the average density determined at a highest level of the product in the tank to calculate an offset of the buoyancy measurement.

In an embodiment, the instructions are further operable to use the average density based on the pressure measurement when the product level is at a high level of the product to compensate for offset errors.

In an embodiment, the instructions are further operable to: use the average density determined at a highest level of the product in the tank to calculate an offset of the buoyancy measurement; and use the average density based on the pressure measurement when the product level is at a high level of the product to compensate for offset errors with respect to the offset.

An embodiment of the system can further include an electromechanical servo gauge that can perform the buoyancy measurement.

An embodiment of the system may also include a pressure transmitter that can perform the pressure measurement.

An embodiment of the system can also include a density sensor mounted in a wall of the tank, wherein the density sensor can be used to compensate offset errors in density measurements.

In an embodiment of the system, the pressure may comprise hydrostatic pressure.

In an embodiment, an apparatus for measuring density, can include an electromechanical servo gauge for performing a buoyancy measurement with respect to a product in a tank, wherein a first density is determined based on the buoyancy measurement; and a pressure sensor for performing a pressure measurement of pressure in the tank, wherein a second density is determined based on the pressure measurement, wherein an average density in the tank is calculated based on the first and second densities, and wherein average densities measured in at least two positions in the tank are combined to increase an accuracy in measuring density within the tank.

In an embodiment of the apparatus, the average density determined at a highest level of the product in the tank can be used to calculate an offset of the buoyancy measurement.

In an embodiment of the apparatus, the average density based on the pressure measurement when the product level is at a high level of the product in the tank can be used to compensate for offset errors.

In an embodiment of the apparatus, the average density determined at a highest level of the product in the tank can be used to calculate an offset of the buoyancy measurement, and the average density based on the pressure measurement when the product level is at a high level of the product can be used to compensate for offset errors with respect to the offset.

In an embodiment of the apparatus, the pressure may comprise hydrostatic pressure.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the principles of the embodiments.

Identical or similar parts or elements in the figures may be indicated by the same reference numerals.

DETAILED DESCRIPTION

Figure 1A:
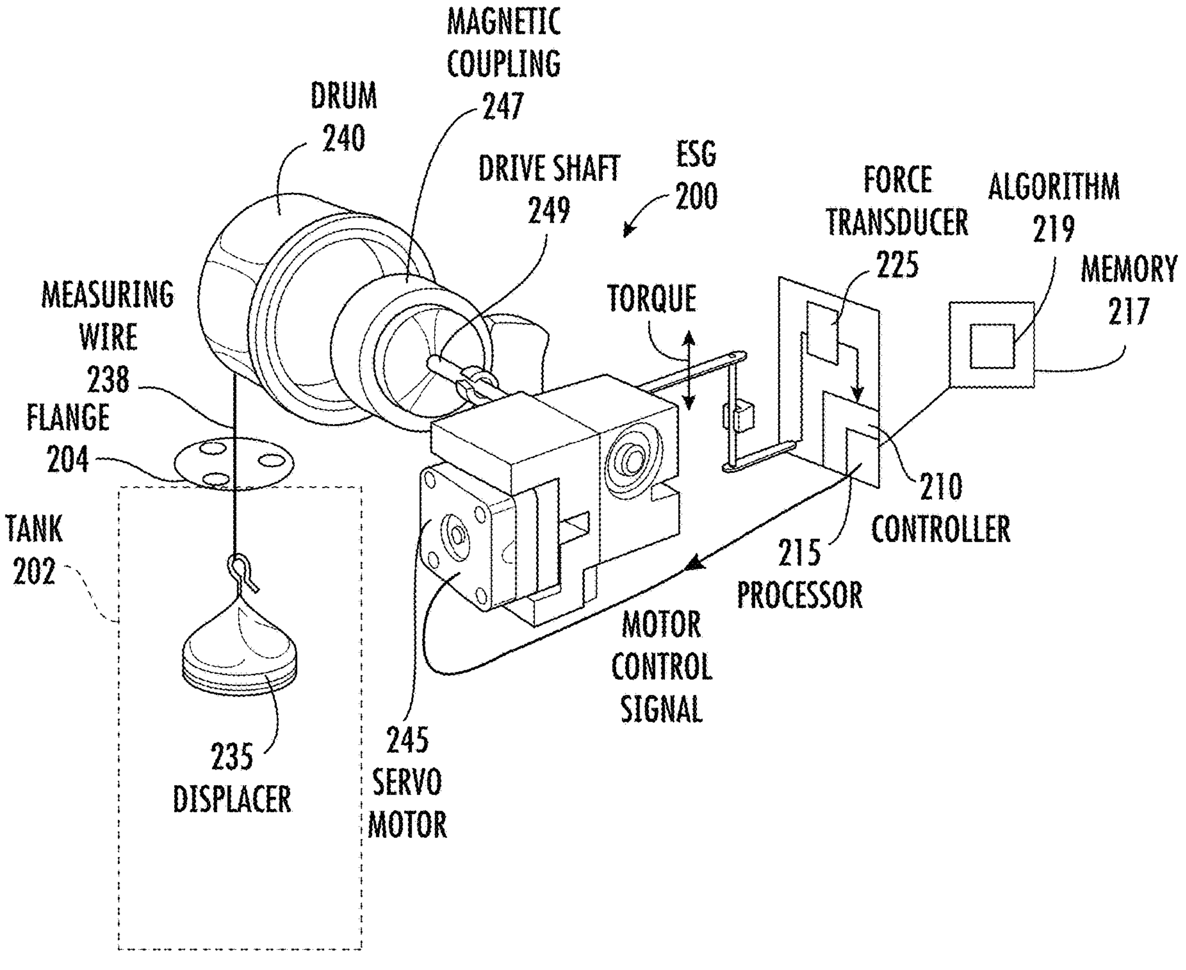
FIG. 1A illustrates a schematic diagram of an electromechanical servo gauge (ESG), which can be adapted for use in density measurement operations, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, “or” if used to associate a list, such as A, B, or C, is intended to mean A, B, and C, here used in the inclusive sense, as well as A, B, or C, here used in the exclusive sense. In addition, the term “one or more” as used herein, depending at least in part upon context, may be used to describe any feature, structure, or characteristic in a singular sense or may be used to describe combinations of features, structures, or characteristics in a plural sense. Similarly, terms such as “a,” “an,” or “the”, again, may be understood to convey a singular usage or to convey a plural usage, depending at least in part upon context. Furthermore, the term “at least one” as used herein, may refer to “one or more.” For example, “at least one widget” may refer to “one or more widgets.”

In addition, the term “based on” may be understood as not necessarily intended to convey an exclusive set of factors and may, instead, allow for existence of additional factors not necessarily expressly described, again, depending at least in part on context.

FIG. 1A illustrates a schematic diagram of an electromechanical servo gauge (ESG) 200, which can be adapted for use in density measurement operations, in accordance with an example embodiment. Note that the term ‘servo’ as utilized herein can also be used to refer to an ESG. The ESG 200 can include a controller 210 comprising a processor 215 having an associated memory 217 storing an algorithm 219 for performing a density measurement involving steps and operations such as those implementing the method 100 shown in FIG. 4, according to an example embodiment. The processor 215 can include a microprocessor, a microcontroller, a field programmable gate array, a digital signal processor, or another processing or control device.

A force transducer 225 is shown in FIG. 1A on a common PCB board with the processor 215. The force transducer 225 can convert a torque on a drum 240 into frequency (f) that can be coupled to an input of the controller 210 acting as a Servo Processor Unit (SPU) which renders a torque measurement.

ESG 200 includes a displacer 235 within a tank 202 that has a flange 204. The displacer 235 is suspended on a measuring wire 238 from the drum 240 that can extend through the flange 204 for causing a torque on the drum 240. The displacer shape and displacer dimensions are generally known. A servo motor with a gear (servo motor) 245 can be coupled by a drive shaft 249 to rotate the drum 240 to balance a weight of the displacer 235 in the tank 202 having a liquid therein (not shown). An equilibrium condition exists when the displacer 235 is at a top surface of the liquid, wherein a change in the liquid level causes a change in a counterforce to move the ESG 200 out of balance. As noted above, although not shown, any force which acts via the measuring wire 238 on the drum 240 sensed by force transducer 225 can be transferred as a torque to the processor side of the ESG 200 using a magnetic coupling 247.

The displacer 235 can be implemented as a mechanical body suspended on a strong thin measuring wire, such as the measuring wire 238, wherein the displacer material possesses a higher density than the liquid to be measured. The measurement wire 238 can be wound on a high accuracy machined grooved drum with a calibrated circumference. The apparent weight resulting from the weight of the displacer 235 minus the weight of the displaced liquid product can be measured and then used by a computing device such as a microcontroller with the servo motor 245 used to rotate the drum 240 in order to position the displacer 235 at a different height in the tank.

Figure 1B:
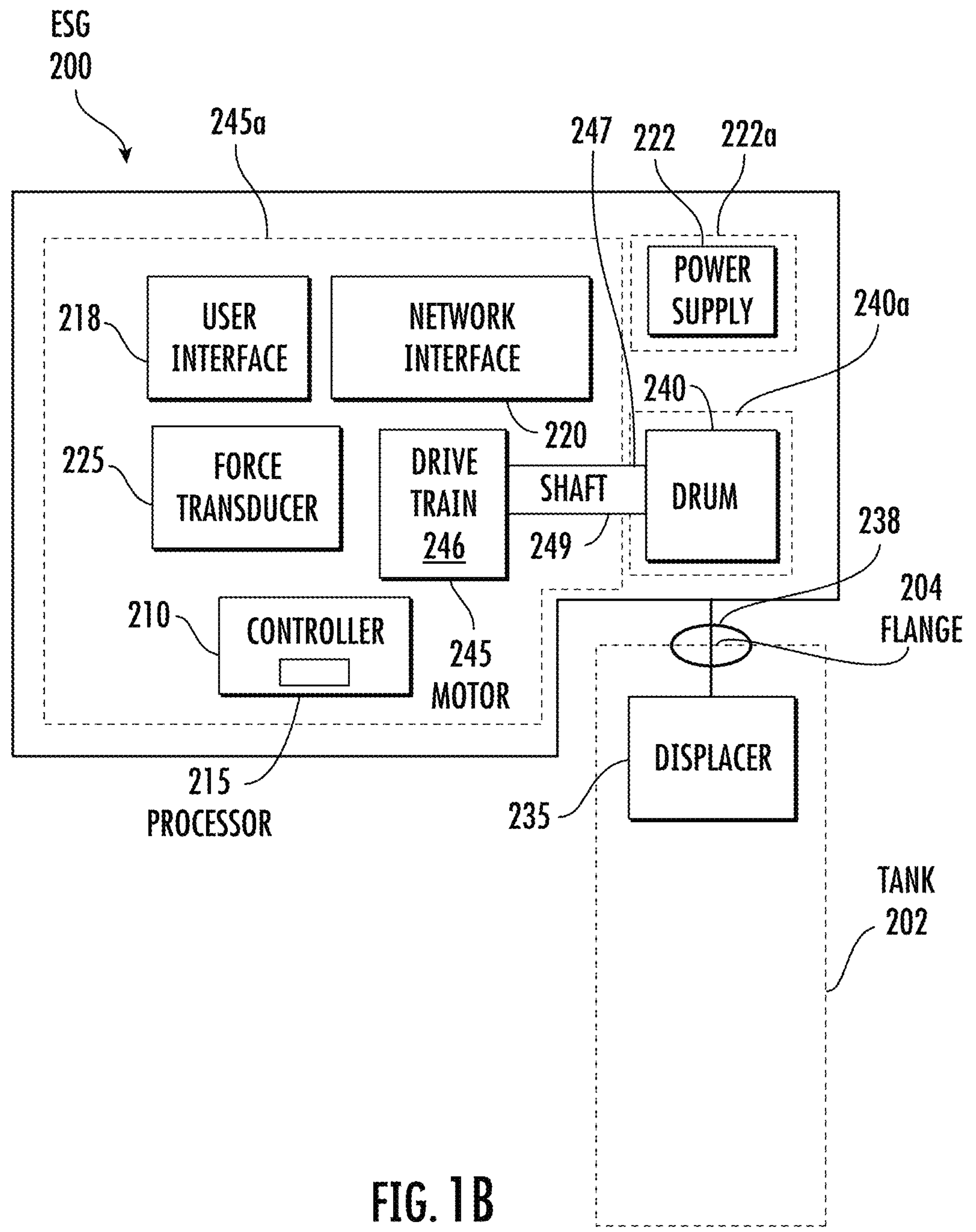
FIG. 1B illustrates a block diagram of the ESG shown in FIG. 1, in accordance with an embodiment.

FIG. 1B illustrates a block diagram of the ESG 200 shown in FIG. 1, in accordance with an example embodiment. As shown in FIG. 1B, the ESG 200 can include three compartments, a drum compartment 240 *a*, a drive compartment 245*a*, and a power supply compartment 222 *a*. The drum compartment 240 *a* can include the drum 240 on which a wire 238 can be wound. The drum 240 can be rotated in one direction by the drive compartment 245 *a* to lower the displacer 235, and the drum 240 can be rotated in another direction by the drive compartment 245 *a* to raise the displacer 235. The drum 240 can include any suitable structure for raising and lowering the displacer 235 via rotation.

The drive compartment 245*a* can include a motor 245 comprising a drive train 246, which imparts rotation to the drum 240 via a shaft 249. For example, the drive train 246 or shaft 249 could generate a magnetic field, and a magnetic coupling 247 can be used to convey torque between the shaft 249 and the drum 240. In these embodiments, no direct connection may be needed between the drum compartment 240*a* and the other compartments 245*a*, 222*a*. However, other techniques for causing rotation of the drum 240 can be used, such as when the shaft 249 is physically connected to the drum 240. The drive train 246 includes any suitable structure for imparting rotation to the drum 240. In some embodiments, the drive train 246 may include a stepper motor that causes the drum 240 to rotate in specified steps, meaning the drum 240 does not rotate freely but rotates in defined amounts or “steps.” Each step of the motor 245 should therefore impart a known amount of rotation to the drum 240. In these embodiments, since the drum 240 may have a known diameter or circumference, the length of connector the wire 238 that is dispensed or collected during a single step rotation can be known with a high degree of certainty.

The drive compartment 245*a* also can include a force transducer 225 which can identify the torque induced on the drum 240 by the weight of the displacer 235. When the displacer 235 is dangling from the wire 238, the measured torque is higher. When the displacer 235 is completely or partially submerged in the material in the tank, the measured torque is lower. The force transducer 225 generally identifies the torque on the drum 240 by measuring the torque on the shaft 249.

ESG 200 is shown including a user interface 218 and a network interface 220 in the drive compartment 245*a*. The user interface 218 facilitates communications between the ESG 200 and an operator or other plant personnel. The user interface 218 can provide data from an operator to the controller 210, such as a command to initiate level measurements, a command to raise or lower the displacer 235, or a command to enable or disable testing of the ESG 200. The user interface 218 can also allow the personnel to review measurement data generated by the ESG 200. The user interface 218 can include any suitable interface for interacting with one or more users, such as a keypad or keyboard and a display.

The network interface 220 can facilitate the communication of data to or from the ESG 200. For example, the network interface 220 could receive level measurements calculated by ESG 200 and transmit the level measurements to one or more external destinations (such as the force transducer 225). The network interface 220 can include any suitable structure supporting wired or wireless communications, such as an Ethernet interface, an RF transceiver, or other wired or wireless interface.

The power supply compartment 222*a* includes a power supply 222, which provides operating power for the ESG 200. The power supply 222 can provide power to various components of the drive compartment 245*a*. Depending on the implementation, the power supply 222 may or may not supply power to the drum compartment 240*a*. The power supply 222 can include any suitable structure for providing power, such as a battery, fuel cell, or solar cell.

Note that the servo or ESG 200 shown in FIG. 1A and FIG. 1B is presented herein for illustrative and exemplary purposes only and should not be considered a limiting feature of the embodiments. Other types of devices and systems may be utilized in place of the ESG 200 to achieve the same results of the embodiments. For example, the non-limiting SmartServo FlexLine 954 device may be adapted for use with the embodiments. The SmartServo FlexLine 954 device is described and illustrated in the document entitled "Installation Manual 954 SmartServo FlexLine," Part No: 4417341 Revision 10, 2019, Honeywell International Inc., which is incorporated herein by reference in its entirety.

Figure 2:
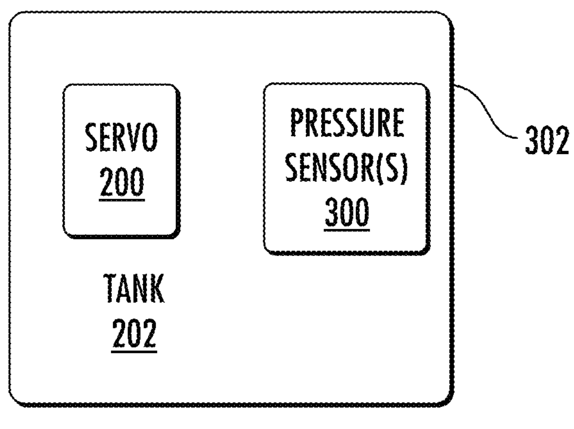
FIG. 2 illustrates a block diagram of a density measurement system that includes an ESG and one or more pressure sensors in accordance with an embodiment.

FIG. 2 illustrates a block diagram of a density measurement system 302 that includes the ESG 200 and one or more pressure sensors 300 in accordance with an embodiment. The ESG 200 can be used for accurate measurement of product level and the water interface level in the tank 202 (e.g., a bulk storage tank used for typical hydrocarbons (often referred to as fuel and oil) and a variety of other liquid chemicals). These products, can range from very light chemicals, like so called LPG's (mixtures of propane and butane or even liquefied natural gas (LNG)) to all types of refined products such as naphtha, gasoline, diesel, jet fuels, lubricants and all types of chemicals, both pure and mixed.

Figure 3:
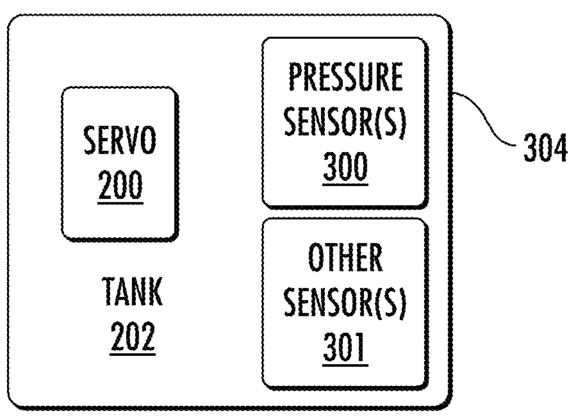
FIG. 3 illustrates a block diagram of a density measurement system that includes an ESG, one or more pressure sensors and/or one or more other types of sensors (e.g., a density sensor), in accordance with an embodiment.

FIG. 3 illustrates a block diagram of a density measurement system 304 that can include an ESG 200, along with one or more pressure sensors 300 and/or one or more other types of sensors 301 (e.g., density sensor), in accordance with an embodiment. The density measurement system 304 includes the tank 202. The one or more pressure sensors 300 can be utilized to measure, for example, hydrostatic pressure in the tank 202. Note that pressure sensor(s) 300 in some embodiments may comprise a pressure transducer. As noted above, the sensor(s) 301 may be implemented as other types of sensors. For example, sensor 301 may be implemented as an external (e.g., non-buoyancy based) density sensor that can be used to compensate for errors. In some embodiments, the use of a density sensor may result in a simpler approach than using a pressure sensor(s) and the "flow" (e.g., see method 100 of FIG. 4) would be even simpler.

Figure 4:
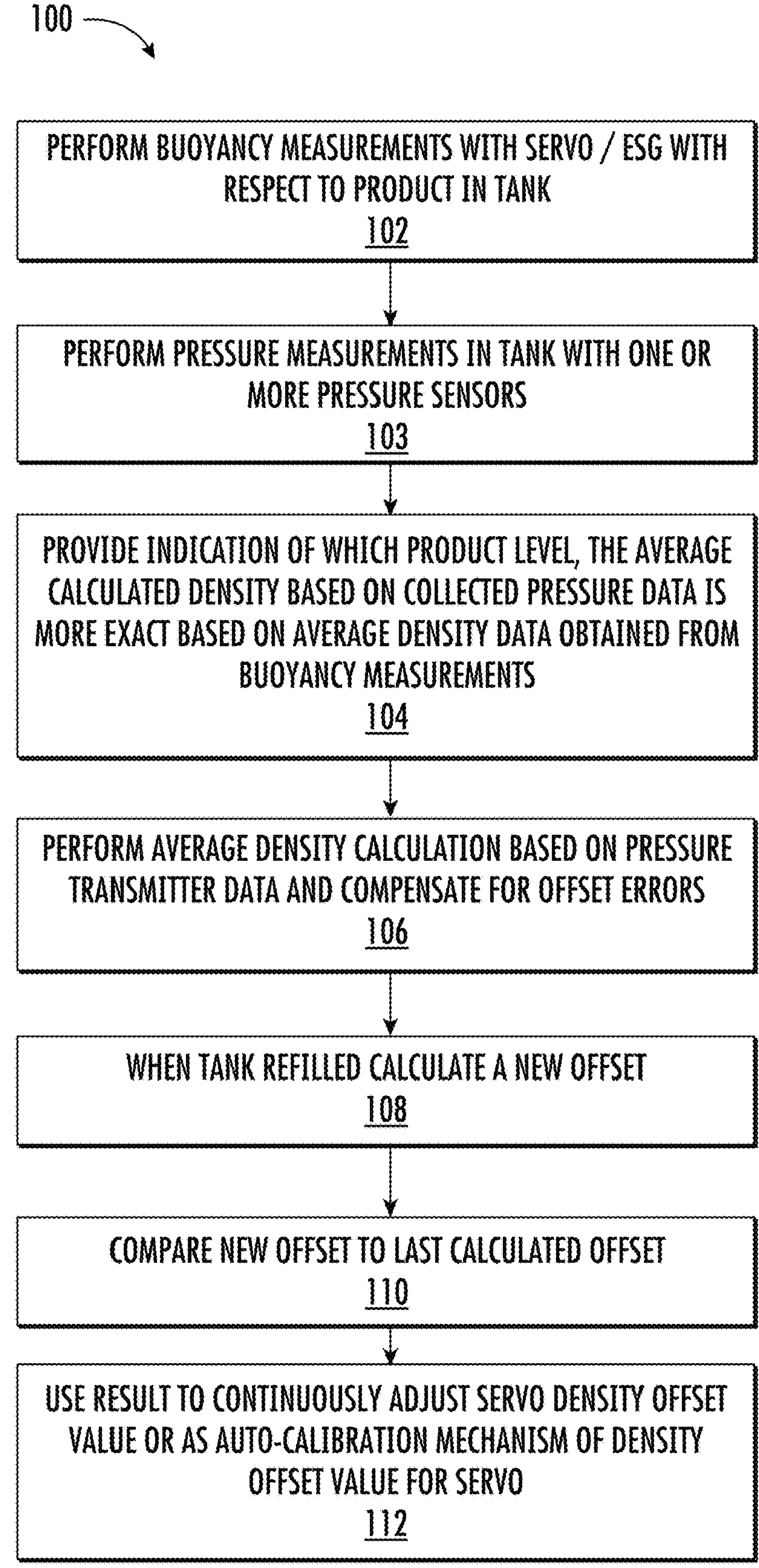
FIG. 4 illustrates a flow chart of operations depicting logical operational steps of a density measurement method, which can be implemented in accordance with an embodiment.

FIG. 4 illustrates a flow chart of operations depicting logical operational steps of a density measurement method 100, which can be implemented in accordance with an embodiment. The density measurement method 100 can include the use of an installed sensor (e.g., ESG 200, pressure sensor(s) 300, other sensors 301 (e.g., density sensor), etc.), which can contribute to improved accuracy in measuring the product density in the storage tank 202. To achieve this, the accuracy in the individual densities should be improved. To do so, the measured average density from the installed sensor can be combined with the individual densities measured from a current instrument at several positions in the liquid storage tank 202.

Density measurements in the storage tank 202 based on the previously discussed buoyancy principle have a significant advantage in that it is very easy to perform measurements at different locations in the storage tank 202, so that a density profile can be created. This way it is possible to create a very exact profile of different density layers in the product. However, various factors in the practical implementation of density measurement based on buoyancy may cause an offset error which cannot be easily removed. By combining other means of determining density, such as with pressure sensors 300, which can only determine an average density of the (partly) filled tank 202, the offset error can be removed.

As shown at block 102, a step or operation can be implemented in which one or more buoyancy measurements are made with respect to the product in the tank 202. Next, as indicated at block 103 pressure sensor measurements can be made in the tank 202 using, for example, the pressure sensor(s) 300 shown in FIG. 2 and FIG. 3. The measurements made by the pressure sensor(s) 300 as shown at block 103 can result in pressure transmitter data. Thereafter, as shown at block 104, a step or operation can be performed to provide an indication of which product level the average calculated density based on pressure transmitter data input is more exact than the average density data from the buoyancy measurement(s) made as shown at block 102.

Once this is known, any average density calculation based on the pressure transmitter data measured or determined when the product level is higher, can be used to compensate for offset errors. That is, the higher the product level (e.g., liquid in a storage tank), the more exact the calculation of the offset error. Thus, the operation shown at block 106 can involve an average density calculation based on the pressure transmitter data collected from the pressure sensor(s) 300 and compensating for offset errors. In the operation shown at block 106, the average calculated density at the highest product level can be used to calculate the offset of the buoyancy measurement. Even if the product level becomes very low, the calculated offset can still be used.

Next, as shown at block 108, when the tank 202 is refilled with a new product a new offset can be calculated for diagnostic purposes. This new offset can be compared, as shown at block 110, to the last calculated offset and then used for continuous re-adjusting of a servo density offset value, or as an auto-calibration mechanism of a density offset value of the servo 200, as shown at block 112.

In an alternative embodiment, a separate density sensor (e.g., other sensors 301 shown in FIG. 3) can be mounted in the tank wall of the tank 202 at a position about one meter from the bottom of the tank 202. If the displacer 235 is at the same height as the density sensor, the density sensor can be used to compensate offset errors in the density measurements based on the buoyancy measurement principle.

With the approach described herein, if one knows the liquid level in the storage tank 202 and the pressure (e.g., hydrostatic pressure), it is possible to calculate volume and the average density of the product inside the storage tank 202, provided that the shape of the tank 202 is known, along with some parameters such as, for example, local gravity, etc.

Current instruments are very good at measuring density differences at various heights in the tank 202. However, they are less effective in determining absolute density. Combining the measured average density as discussed above with the individual densities at several positions in the storage tank 202 can increase the accuracy in determining the individual densities.

Although the operations of the method(s) herein are shown and described in a particular order, the order of the operations may be altered so that certain operations may be performed in an inverse order or so that certain operations may be performed, at least in part, concurrently with other operations. In another embodiment, instructions or sub-operations of distinct operations may be implemented in an intermittent and/or alternating manner.

At least some of the operations for the method(s) described herein can be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments of the invention may be implemented in hardware or in an implementation containing hardware and software elements. In embodiments that do utilize software, the software may include firmware, resident software, microcode, etc.

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that the blocks of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for measuring density, comprising:

performing a buoyancy measurement with respect to a product in a tank at a first position and determining a first density based on the buoyancy measurement at the first position, wherein the first position is a predetermined position in the tank;

performing a pressure measurement of pressure in the tank at the predetermined position and determining a second density based on the pressure measurement at the predetermined position in the tank;

calculating an offset of the buoyancy measurement using the first density and the second density; and applying the offset to correct the first density measured at the predetermined position in the tank.

2. The method of claim 1 further comprising:

calculating the offset of the buoyancy measurement using the first density and the second density determined when the product fills the tank to the predetermined position.

3. The method of claim 1 wherein the buoyancy measurement is performed by an electromechanical servo gauge.

4. The method of claim 1 wherein the pressure measurement is performed by a pressure sensor comprising a pressure transmitter.

5. The method of claim 1 wherein the pressure comprises hydrostatic pressure.

6. A system for measuring density, comprising:

at least one processor; and a non-transitory computer-usable medium embodying computer program code, the computer-usable medium operable to communicate with the at least one processor, the computer program code comprising instructions executable by the at least one processor and operable for:

performing a buoyancy measurement with respect to a product in a tank at a first position and determining a first density based on the buoyancy measurement at the first position, wherein the first position is a predetermined position in the tank;

performing a pressure measurement of pressure in the tank at the predetermined position and determining a second density based on the pressure measurement at the predetermined position in the tank;

calculating an offset of the buoyancy measurement using the first density and the second density; and applying the offset to correct the first density measured at the predetermined position in the tank.

7. The system of claim 6 wherein the instructions are further operable to use the first density determined when the product fills the tank to the predetermined position of the tank to calculate the offset of the buoyancy measurement.

8. The system of claim 6 wherein the instructions are further operable to:

use the first density determined when the product fills the tank to the predetermined position of the tank to calculate the offset of the buoyancy measurement; and use the second density based on the pressure measurement when the product fills the tanks to the predetermined position in the tank to compensate for offset errors with respect to the offset.

9. The system of claim 6 further comprising an electromechanical servo gauge that performs the buoyancy measurement.

10. The system of claim 6 further comprising a pressure transmitter that performs the pressure measurement.

11. The system of claim 6 further comprising a density sensor mounted in a wall of the tank, wherein the density sensor is used to compensate offset errors in density measurements.

12. The system of claim 6 wherein the pressure comprises hydrostatic pressure.

13. An apparatus for measuring density, comprising:

an electromechanical servo gauge for performing a buoyancy measurement with respect to a product in a tank, wherein a first density is determined based on the buoyancy measurement at a predetermined position in the tank;

a pressure sensor for performing a pressure measurement of pressure at the predetermined position in the tank, wherein a second density is determined based on the pressure measurement; and a processor for calculating an offset of the buoyancy measurement using the first density and the second density, wherein the offset is applied to correct the first density measured at the predetermined position in the tank.

14. The apparatus of claim 13 wherein the first density determined when the product fills the tank to the predetermined position is used to calculate the offset of the buoyancy measurement.

15. The apparatus of claim 13 wherein the second density based on the pressure measurement when the product fills the tank to a predetermined position is used to compensate for offset errors with respect to the offset.

16. The apparatus of claim 13 wherein:

the average first density determined when the product fills the tank is used to calculate the offset of the buoyancy measurement; and the second density based on the pressure measurement when the product fills the tank to the predetermined position is used to compensate for offset errors with respect to the offset.

17. The apparatus of claim 13 wherein the pressure comprises hydrostatic pressure.

* * * * *